Oct. 6, 1931.　　　　F. O'BRIEN　　　　1,826,403
PROCESS AND APPARATUS FOR BENDING TUBING
Filed June 28, 1929　　　7 Sheets-Sheet 1

Inventor
Frank O'Brien
by Blackmore, Spencer & Flint
attorney

Oct. 6, 1931.  F. O'BRIEN  1,826,403
PROCESS AND APPARATUS FOR BENDING TUBING
Filed June 28, 1929  7 Sheets-Sheet 5

Inventor
Frank O'Brien

By Blackmore, Spencer & Hulbert
Attorneys

Patented Oct. 6, 1931

1,826,403

UNITED STATES PATENT OFFICE

FRANK O'BRIEN, OF FLINT, MICHIGAN, ASSIGNOR TO GENERAL MOTORS CORPORATION, OF DETROIT, MICHIGAN, A CORPORATION OF DELAWARE

PROCESS AND APPARATUS FOR BENDING TUBING

Application filed June 28, 1929. Serial No. 374,328.

This invention relates to an improved machine for forming either single or multiple bends in metal tubing.

Heretofore such bending operations have been performed either by hand or in machines which depend to some extent upon the skill and cooperation of the operator, and this results in lowering the speed of the machine to the ability and deftness of the operator, and in a lack of uniformity and quality, particularly in the smoothness of the surface of the tubing, and changes in size or shape of the tubing at the bends.

The principal objects of the present invention are to overcome these difficulties. In the present embodiment of the invention the steps employed are performed automatically in their proper sequence, and in such a mode that after the machine has been adjusted by a competent mechanic, skilled labor may be dispensed with in the operation of the machine. This, as well as the mode of making the bends, promotes rapid and accurate bending of metal tubing.

Other objects and advantages will be apparent upon referring to the specification and accompanying drawings, in which:

Figure 9 is a fragmentary horizontal sectional view through the supporting member which is inserted inside the tubing while it is being bent.

Bending mechanism

Figures 2, 6:
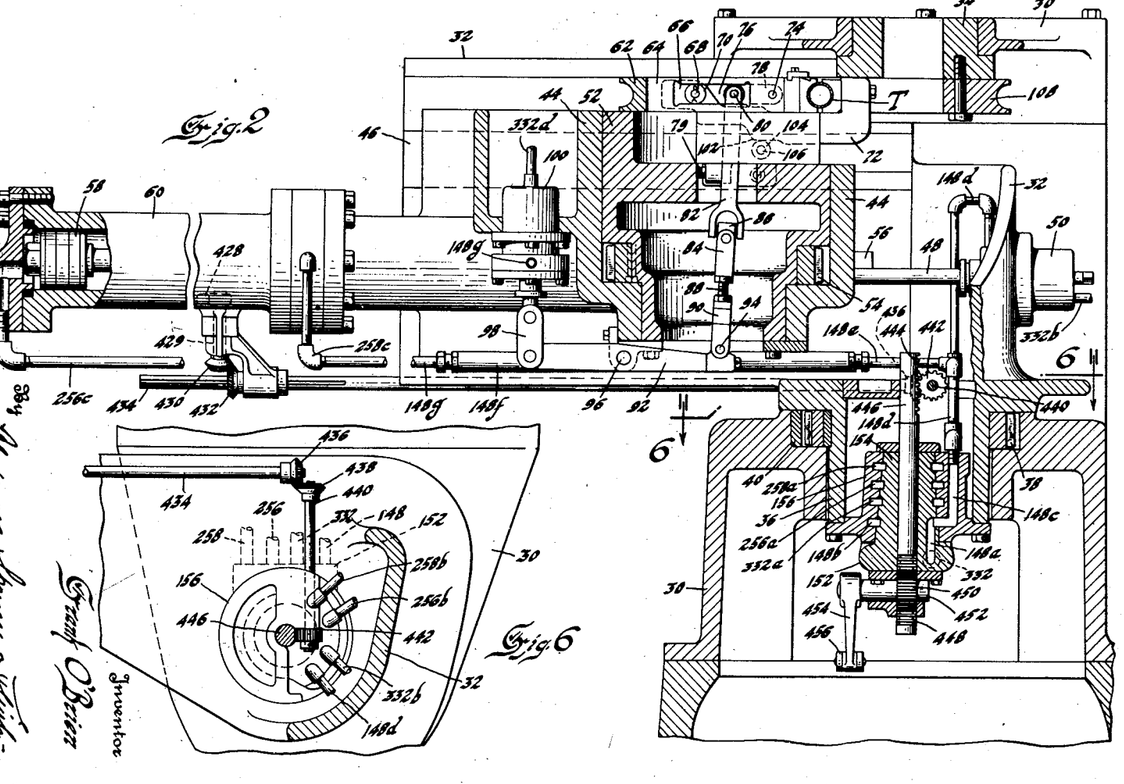
Figure 2 is a sectional view taken on the line 2—2 of Figure 1.
Figure 3:
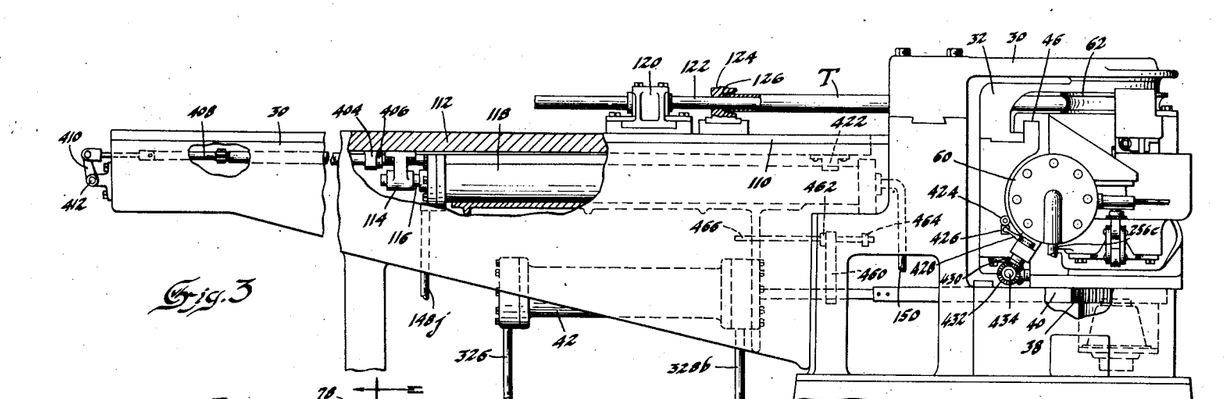
Figure 3 is a rear elevation of the machine.
Figure 7:
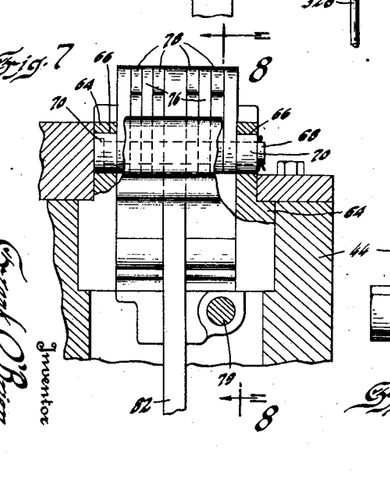
Figure 7 is a fragmentary view, partly in section, of the mechanism used for operating the vise which holds the tubing during the bending operations.

The reference numeral 30 indicates a stationary bed or base in which a swinging head 32 is supported by bearing portions 34 and 36 which are journaled in the base, as best shown in Figure 2. A gear 38, keyed to the head, meshes with a rack 40 which is actuated by a piston in a cylinder 42 secured inside the base, as shown in Figure 3. This piston is moved by the admission of any suitable form of pressure medium, such as oil under pressure, into the cylinder. A supporting member or carrier 44 is slidably mounted on guides 46 in the head 32, as best shown in Figure 2. This carrier is constructed so that it may be moved back and forth in the head, and is so moved by a rod 48 connected with a piston in a cylinder 50.

Figure 8:
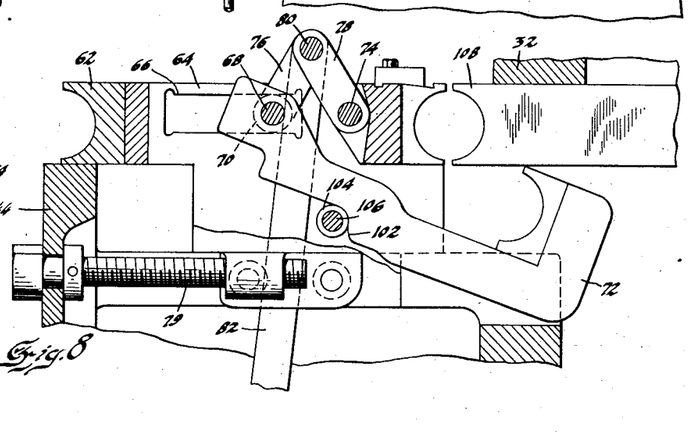
Figure 8 is a sectional view taken on the line 8—8 of Figure 7.

Journaled in the carrier is a rotatable member 52 which has keyed to it a gear 54. This gear meshes with a rack 56 actuated by a piston 58 in a cylinder 60 supported on the carrier. Secured to the member 52 is an annular grooved member 62 hereinafter referred to as the first bend sheave. It will be seen that as the piston 58 is caused to move, the rack 56 will rotate the gear 54 and with it the member 52 and the sheave 62. The latter is cut away at one side to provide room for a support 64 having slots 66 formed in both sides, as best shown in Figure 8. A pin 68 forms a movable pivot and is supported in rollers 70 which are held in the slots. Pivoted on the pin 68 is a clamping member or vise 72. Connected to the pin 68 and to a stationary pivot member 74 are toggle links 76 and 78, both of which are pivotally secured to a pin 80. The support 64 and the mechanism carried by it may be moved horizontally toward or away from the sheave 62 by an adjusting screw 79 rotatably supported in the carrier 44.

Also secured to the pin 80 is an operating link 82 which is connected to a member 84 by a universal joint 86. An adjustable connection 88 is interposed between the member 84 and a swivel member 90, provided to permit relative rotation between the member 84 and a rocker arm 92 to which the swivel member 90 is pivotally connected at 94. The rocker arm is pivotally supported from the carrier 44 at 96. The other end of the rocker arm is connected by means of a link 98 to a piston in a cylinder 100, supported from the carrier 44 as shown in Figure 2.

Figures 1, 4, 5, 6:
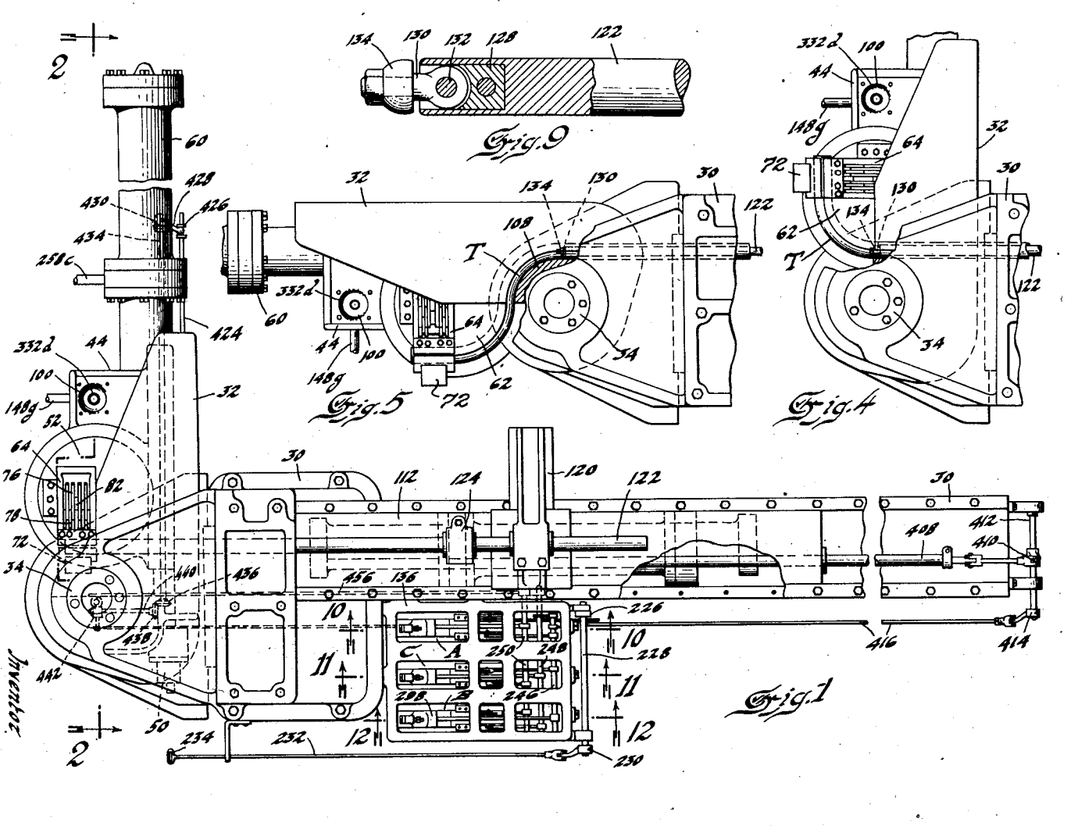
Figure 1 is a plan view of my improved machine, showing the various parts in the starting position.
Figure 4 is a fragmentary view, similar to Figure 1, but showing the position of some of the parts after the first bend has been formed in the tubing.
Figure 5 is a view similar to Figure 4, but showing the position of the parts after the second bend has been formed in the tubing.
Figure 6 is a sectional view taken on the line 6—6 of Figure 2.

The vise 72 is shown in open or unclamped position in Figure 8 and is moved to clamped position, as shown in Figure 5, by upward movement of the piston in the cylinder 100. This causes the rocker arm and the intermediate connecting linkage to pull the pin 80 downward. Since the pin 68 is mounted in the rollers 70 which operate in the slots 66, this downward movement causes the pin 68 to move to the left as viewed in Figure 8, and since the vise 72 is also pivoted on the pin 68, it moves to the left. A cam surface 102 on the underside of the vise rides up on a roller 104 journaled on a pin 106 held in the support 64. This causes the free end of the vise to swing up to the position shown in Figure 2, for a purpose to be described later.

Secured to the head 32 is another annular grooved member 108 hereinafter referred to as the second bend sheave. A portion of this sheave is cut away to provide room for the vise 72 as shown in Fig. 8. Slidably supported in guides 110 on the base 30 is a support 112, to the underside of which is secured a bracket 114, connected to a piston rod 116 which in turn is secured to a piston in a cylinder 118 supported in the base 30. Carried by the support 112 is a holder 120 in which is clamped a bar 122. This bar slides through a stationary collar 124 supported on the base 30. A shoulder 126 is formed in the collar 124 for a purpose to be described later. As shown in Fig. 9, the free end of the bar 122 is bored out to receive a bearing member 128. A swivel member 130 is pivotally secured in the bearing member by a pin 132 and a spherically shaped member 134, hereinafter referred to as a ball, is mounted on the end of the swivel member 130.

*Operation of bending mechanism*

Having described the principal parts of the machine, exclusive of the controls therefor, a brief statement of the bending operations will be given, after which the controls and their operation will be described. In the starting position, the carrier 44 is in its left hand position, as viewed in Fig. 2, in order that the first bend sheave 62 will be far enough away from the second bend sheave 108 to permit the easy insertion therebetween of the piece of tubing, referred to by the letter T. The tubing is pushed into the machine until it strikes the shoulder 126 in the collar 124, which serves to center it. The operator then starts the machine in operation and the first step is to move the carrier 44 to the right by means of the piston in the cylinder 50 so that the sheaves 62 and 108 fit snugly against the tubing T.

At the same time the piston in the cylinder 100 is moved upwardly and through the intermediate linkage causes the toggle members to be pulled downwardly, thus moving the vise 72 to the position shown in Fig. 2, wherein the tubing T is tightly clamped between the vise and the first bend sheave 62. An advantage of the toggle mechanism is that it limits the maximum pressure which may be placed on the vise, since after the toggle mechanism is moved to dead center position, as shown in Fig. 2, the clamping pressure obviously cannot be increased. The adjusting screw 79 is provided to vary the position of the vise relative to the tubing, and the result is that after the proper adjustment is made, the clamping pressure is great enough to positively prevent slipping of the tubing in the vise, yet it is not great enough to cause the tubing to collapse, and consequently it is not necessary to insert a reinforcing member inside the tubing at the point where the vise is clamped, as is usually the case. This, of course, simplifies the machine. It will be readily seen that the use of the toggle mechanism renders the clamping pressure of the vise independent of variations which may develop in the amount of pressure supplied to the cylinder 100.

The next operation is to cause the bar 122 to be moved into the tubing, by means of the piston in the cylinder 118, so that the center of the ball 134 will be in a line drawn through the centers of the sheaves 62 and 108. After this the rotatable member 52 is caused to be rotated the desired number of degrees by the rack and the piston 58 in the cylinder 60. Since the tubing is clamped between the vise 72 and the first bend sheave 62, both of which are secured to the rotatable member 52, the result of the rotation of the latter is to cause the tubing to be drawn around with the sheave 62, over the ball 134 on the end of the bar 122, as shown in Fig. 4. Since the ball is swivelled in the bar 122, it is free to accommodate itself to any irregularities on the inside surface of the tubing. Due to the fact that the outside of the tubing is supported by the sheaves 62 and 108 and the inside by the ball, the first bend is formed without permitting any change to occur in the cross-sectional shape of the tubing. Consequently both the inside and outside surface of the tubing are as smooth after bending as before.

The next step is to swing the head 32 around to the position shown in Fig. 5, by means of the rack 40 and the piston in the cylinder 42. During this operation the vise 72 still clamps the tubing tightly against the first bend sheave 62 which is prevented from rotating in the carrier 44 by the fact that the oil pressure is the same on both sides of the piston 58 during this operation. The result of the swinging movement of the head 32 is that the tubing is drawn over the ball 134 in the opposite direction and the second bend is formed under the same conditions as is the first bend.

Now that the bending operations are completed, the next step is to return the parts to starting position. The bar 122 is withdrawn from the tubing, after which the vise 72 is moved to unclamped position and at the same time the carrier 44 is moved to the left to move the first bend sheave 62 away from the second bend sheave 108. Next, the swinging head 32 is returned to its original position. The necessity for constructing the vise 72 so it will drop down in unclamped position, as shown in Fig. 8, will be evident at this point since if the vise did not drop down below the tubing it would prevent the head 32 from being returned. The last step is to return the rotatable member 52, and the first bend sheave 62 and the vise 72 supported on it, to their original position. All of the parts are now back in their starting position and the piece of tubing in which the bends have been placed may be easily removed from the machine and another piece placed therein, after which the machine may be started again.

It will be obvious that the various parts may be made to function in the above described cycle by an operator who would cause the various cylinders to function at the proper time, but this would require a skilled operator and there would always be the possibility that the steps might not take place in their proper order. To avoid this and to shorten the time required for the bending operations, an ingenious control for the various parts of the machine has been devised. This control is entirely automatic in operation from the time it is started by the operator until all of the parts have been returned to starting position.

*Automatic control mechanism*

Figure 10:
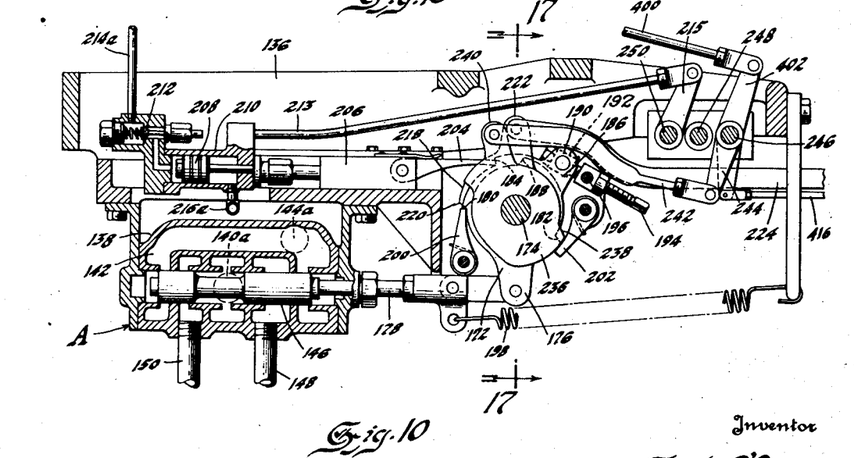
Figure 10 is a sectional view taken on the line 10—10 of Figure 1, showing one of the valves which control the movement of the actuating parts of the machine, together with the operating means for the valve.

Referring to Fig. 1 it will be seen that a support 136 is mounted on the base 30. Valve units A, B and C are carried by this support. Fig. 10 is a sectional view through the valve unit A showing the various parts in neutral position, or the position they are in before the machine is started in operation. This unit is composed of a valve housing 138 having an inlet 140a for oil or other liquid under a comparatively high pressure, conducted from any suitable form of pump through the feed pipe 140. An exhaust chamber 142 is formed in the valve housing and communicates with an exhaust outlet 144a which in turn is connected to a pipe 144 which returns the oil to the pump. A piston 146 is slidably mounted in the housing and when it is moved to the right, permits the pressure medium to flow out through a pipe 148. When moved to the left it allows the pressure medium to flow through a pipe 150.

The pipe 148 conducts the oil under pressure to the cylinders 50, 100, and 118, but since the cylinders 50 and 100 are mounted on the swinging head 32, a swivel type pipe joint must be provided in the pipes leading to them. Therefore a stationary manifold 152 is supported in the base and the pipe 148 is connected to it. A passage 148a in the manifold communicates with a groove 148b formed partly in a tapered portion 154 of the manifold 152 and partly in a movable member 156 secured to the swinging head 32 and having a tapered surface corresponding with that of the portion 154, for the purpose of insuring a leak-proof joint between the two. A passage 148c in the member 156 communicates with a pipe 148d which leads into the cylinder 50. A branch 148e from the pipe 148d is connected by means of a sliding type pipe joint 148f and a pipe 148g to the cylinder 100. This sliding joint must be provided to permit the carrier 44 to move back and forth with respect to the head 32.

Figures 16, 17, 18, 19, 20, 21, 22, 23, 24:
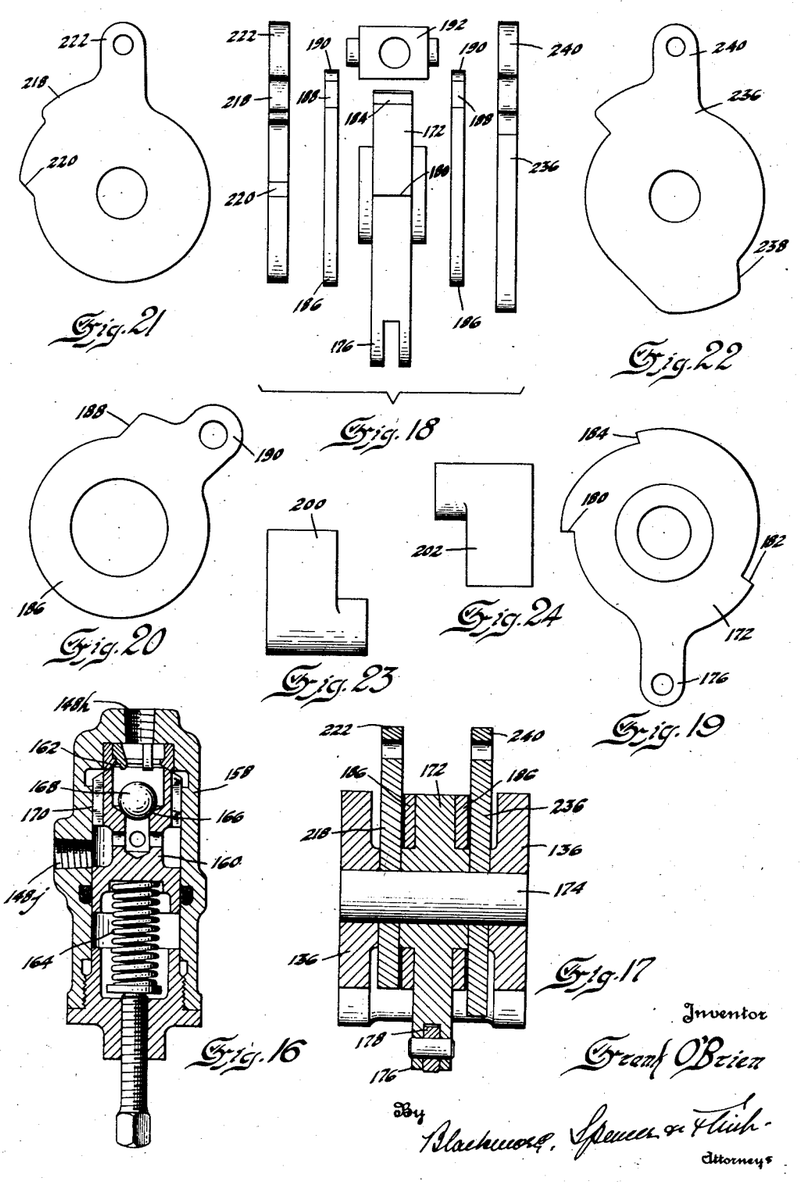
Figure 16 is a vertical sectional view through a valve used in the control mechanism.
Figure 17 is a sectional view taken on the line 17—17 of Figure 10.
Figure 18 is a view corresponding somewhat to Figure 17 but showing the parts in elevation and disassembled from each other.
Figures 19 to 24, inclusive, are detailed views of some of the parts shown in Figure 13.

Also connected with the pipe 148 is a valve 158, shown in Fig. 16. This valve is of the type known as a loading valve, and consists of a piston 160 normally held against a seat 162 by a compression spring 164. An inlet pipe 148h and an outlet pipe 148j are connected to the valve housing. The pipe 148j is connected to the cylinder 118. The piston 160 is bored out to form a seat 166 on which rests a ball valve 168, the purpose of which is to permit the oil under pressure to flow freely from the pipe 148*j* to the pipe 148*h* when the piston in the cylinder 118 is being returned to its original position.

The function of the valve 158 is to delay movement of the piston in the cylinder 118 until after the completion of the movement of the pistons in the cylinders 50 and 100. It will be remembered that in the description of the various movements which take place after the machine is started, it was stated that the vise is clamped and the sheave 62 moved toward the sheave 108 simultaneously, after which the bar 122 is inserted in the tubing T. This is accomplished by making the spring 164 of such strength that it will hold the piston 160 on its seat until the resistance in the line 148 has been built up by the pistons in the cylinders 50 and 100 reaching the end of their operating strokes, whereupon the pressure in the line 148 will become great enough to force the piston 160 off its seat and permit the pressure medium to flow through groove 170 on the outside of the piston and thence through the pipe 148*j* into the cylinder 118. The pipe 150 leads from the valve housing 138 to the opposite end of the cylinder 118 for the purpose of returning the piston therein to its original position.

Referring again to Fig. 10, the movement of the piston 146 in the valve unit A is controlled by a ratchet member 172 rotatably supported on a shaft 174 held in the support 136. An arm 176 formed on the ratchet member 172 is connected to the piston by a rod 178. Teeth or notches 180, 182 and 184 are formed in the ratchet member, as shown in Fig. 19. Two plates 186, having cam surfaces 188 as shown in Fig. 20, are mounted on the hub of the ratchet member 172, one on each side of the latter. Arms 190 on each plate are connected to a block 192 which in turn is connected by an adjusting screw 194 to a cross shaft 196 held in the support 136. The function of this adjusting mechanism is to vary the position of the cam surfaces 188 relative to the rest of the mechanism.

Figure 14:
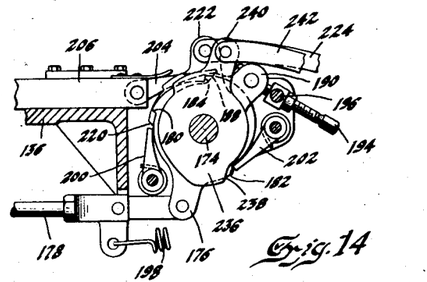
Figure 15:
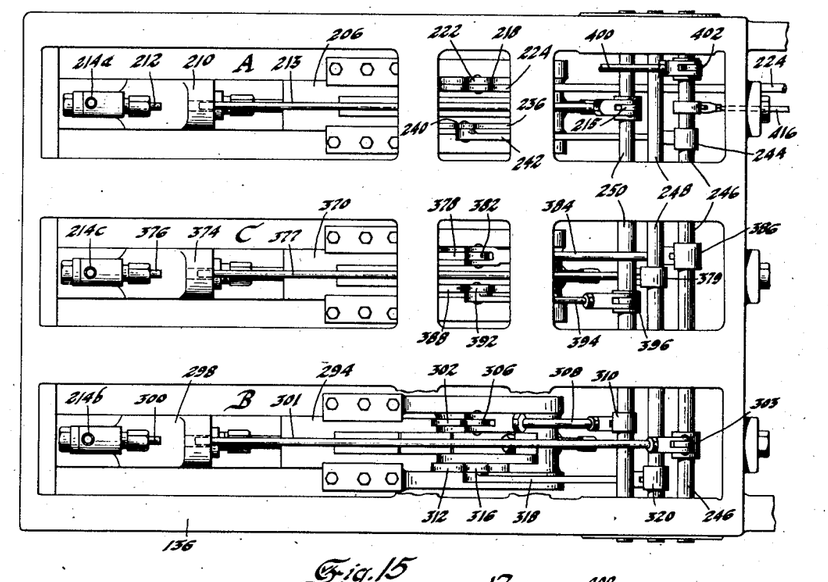
Figure 15 is a plan view of the mechanism shown in Figures 10, 11 and 12.

A tension spring 198 secured to the support 136 and to the rod 178 tends to move the piston 146 to the right, but is prevented from doing so while the parts are in the position shown in Fig. 10 by a pawl 200 which engages the notch 180 in the ratchet member 172. This pawl is mounted on the support 136 and is normally spring held against the member 172. A similar pawl 202 engages the notch 182, as shown in Fig. 14, to hold the piston 146 in the extreme left hand position after it has been moved to that position. The piston is moved to the left by means of a pawl 204 which engages the notch 184 in the ratchet member. This pawl is pivotally supported in a sliding block 206 and is normally spring held against the ratchet member 172. The sliding block is connected to a piston 208 in a cylinder 210 and a spring closed valve 212 may be opened to admit oil under pressure into the cylinder 210 from a pipe 214*a*. A rod 213, slidably mounted in the support 136 and adapted to abut against the end of the valve 212 is connected to a lever 215 secured on the shaft 250. A pipe 216*a* conducts oil under pressure into the opposite end of the cylinder when it is desired to return the piston 208 to its original position. As the pawl 204 is moved to the right to engage the notch 184 to rock the ratchet member 172, it rides upon the cam surfaces 188 on the plates 186 and is thereby raised out of engagement with the notch to permit the ratchet member to be rocked in the opposite direction without interference with the pawl 204.

A cam 218 having an angular surface 220, shown in Fig. 21, is rotatably supported on the shaft 174, on the far side of the ratchet member 172, as viewed in Fig. 10. An arm 222 on the cam 218 is connected by a link 224 to a lever 226 secured to a shaft 228 which is carried by the support 136. Another lever 230 secured on the shaft 228 has connected to it a rod 232 on the end of which is a starting handle 234.

Rotatably supported on the shaft 174 on the near side of the ratchet member 172, as viewed in Fig. 10, is another cam 236 having an angular surface 238, shown in Fig. 22. An arm 240 on this cam is connected by a link 242 to a lever 244 secured on the underside of a shaft 246 rotatably held in the support 136. Other shafts 248 and 250 are also rotatably mounted in the support 136. The shafts 246, 248 and 250 extend substantially the full width of the support 136 and serve to control the movement of all three of the valve units A, B and C.

As stated above, the spring 198 tends to pull the piston 146 to the right, but the latter is held in the neutral position, shown in Fig. 10, by the pawl 200 engaging the notch 180 in the ratchet member 172. This pawl extends across the faces of the ratchet member and the cam 218, and when the latter is rocked in a counter-clockwise direction, the angular surface 220 engages the pawl 200, lifting it out of engagement with the notch 180 and thereby permitting the piston 146 to be moved to the right by the spring 198. When the piston is in the left position and is held by the pawl 202, rocking of the cam 236 in a counter-clockwise direction causes the angular surface 238 to lift this pawl, which extends across the faces of the ratchet member 172 and the cam 236, out of the notch 182, whereupon the piston 146 is moved to the neutral position by the action of the spring 198. The pawl 200 again engages the notch 180 preventing further movement of the piston to the right, until such time as the cam 218 is rocked.

The construction of the valve units B and C is the same as valve unit A. The valve unit B is shown in the extreme right or starting position in Fig. 11, and consists of a valve housing 252 suspended from the support 136, and having an inlet pipe 140b connected with the feed pipe 140, and an exhaust outlet pipe 144b connected to the return pipe 144. A piston 254 is slidably mounted in the housing and when it is moved to the extreme left permits the pressure medium to flow out through a pipe 256 into the cylinder 60 to rotate the first bend sheave in a direction such as will form the first bend in the tubing. Because of the fact that the cylinder 60 is mounted on the swinging head 32, the pipe 256 is connected to the manifold 152, as shown in Fig. 2; and the pressure medium passes through a groove 256a into the member 156 and thence through a pipe 256b and a sliding type pipe joint, similar to that indicated by the numeral 148f, and a pipe 256c into the cylinder 60.

Figure 11:
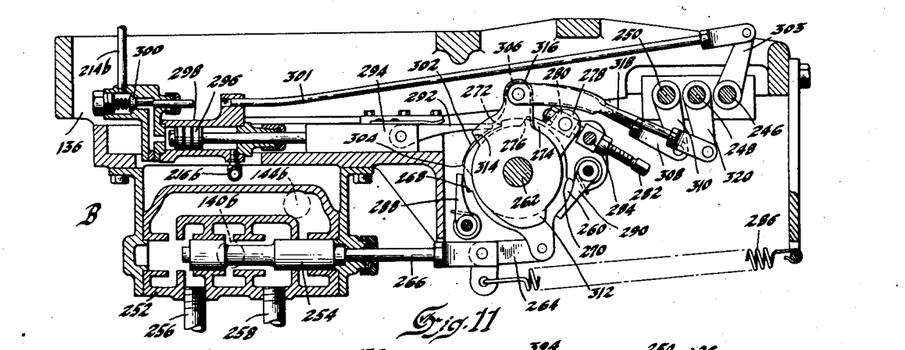
Figure 11 is a similar sectional view taken on the line 11—11 of Figure 1, showing a second valve.

When the piston 254 is in the position shown in Fig. 11 it permits the pressure medium to flow out through a pipe 258 into the manifold 152, through the groove 258a, pipe 258b, another slip type pipe joint and a pipe 258c into the opposite end of the cylinder 60, in order to return the first bend sheave to its starting position. It will be understood, of course, that in this type of valve, when the liquid is being forced through either of the pipes 256 or 258, the liquid in the other pipe will be forced to return to the valve and thence through the exhaust passage 144b to the return line 144, by the movement of the piston 58 in the cylinder 60.

The movement of the piston 254 is controlled by a ratchet member 260 rotatably supported on a shaft 262 held in the support 136. An arm 264 formed on the ratchet member 260 is connected to the piston by a rod 266. Notches 268, 270, and 272 are formed in the ratchet member, similar to those shown in Fig. 19. Two plates 274, having cam surfaces 276 similar to those shown in Fig. 20, are mounted on the hub of the ratchet member 260, one on each side of the latter. Arms 278 on each plate are connected to a block 280, which in turn is connected by an adjusting screw 282 to a cross shaft 284 held in the support 136.

A tension spring 286 secured to the support 136 and to the rod 266, tends to move the piston 254 to the right, but is prevented from doing so when the piston is in central position, by a pawl 288, which engages the notch 268 in the ratchet member 260. This pawl is mounted on the support 136, and is normally spring held against the ratchet member 260. A similar pawl 290 engages the notch 270 to hold the piston 254 in the extreme left hand position after it has been moved to that position. The piston is moved to the left by means of a pawl 292 which engages the notch 272 in the ratchet member. This pawl is pivotally supported in a sliding block 294, and is normally spring held against the ratchet member 260. The sliding block 294 is connected to a piston 296 in a cylinder 298, and a spring closed valve 300 may be opened to admit oil under pressure into the cylinder 298 from a pipe 214b. A rod 301, slidably mounted in the support 136 and adapted to abut against the end of the valve 300, is connected to a lever 303 secured to the shaft 246. A pipe 216b, conducts oil under pressure into the opposite end of the cylinder when it is desired to return the piston 296 to its original position.

A cam 302 having an angular surface 304, similar in shape to that shown in Fig. 21, is rotatably supported on the shaft 262, on the far side of the ratchet member 260, as viewed in Fig. 11. An arm 306 on the cam 302 is connected by a link 308 to a lever 310 secured to the shaft 250, which is carried by the support 136. Rotatably supported on the shaft 262 on the near side of the ratchet member 260, as viewed in Fig. 11, is another cam 312 having an angular surface 314, like that shown in Fig. 22. An arm 316 on this cam is connected by a link 318 to a lever 320 secured on the underside of the shaft 248. The operation of the mechanism in valve unit B is the same as that in valve unit A.

Figure 12:
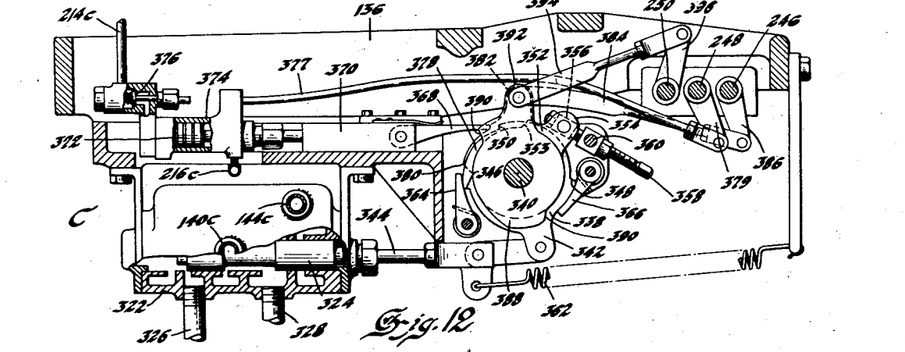
Figure 12 is a similar sectional view taken on the line 12—12 of Figure 1, showing a third valve.
Figure 13:
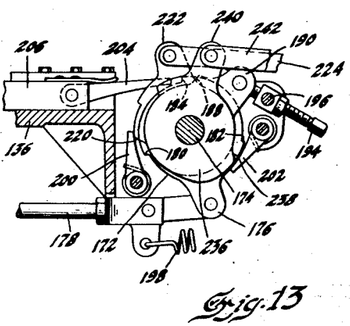
Figures 13 and 14 are fragmentary views of a portion of the mechanism shown in Figure 10, but showing the parts in different positions.

Valve unit C is also shown in the extreme right or starting position in Fig. 12 and is comprised of a valve housing 322 suspended from the support 136, and having an inlet pipe 140c connected with the feed pipe 140, and an exhaust outlet pipe 144c connected to the return pipe 144. A piston 324 is slidably mounted in the housing, and when it is moved to the extreme left, permits oil under pressure to flow out through a pipe 326 into the cylinder 42 to rotate the swinging head 32 in a direction such as will form the second bend in the tubing.

Figure 25:
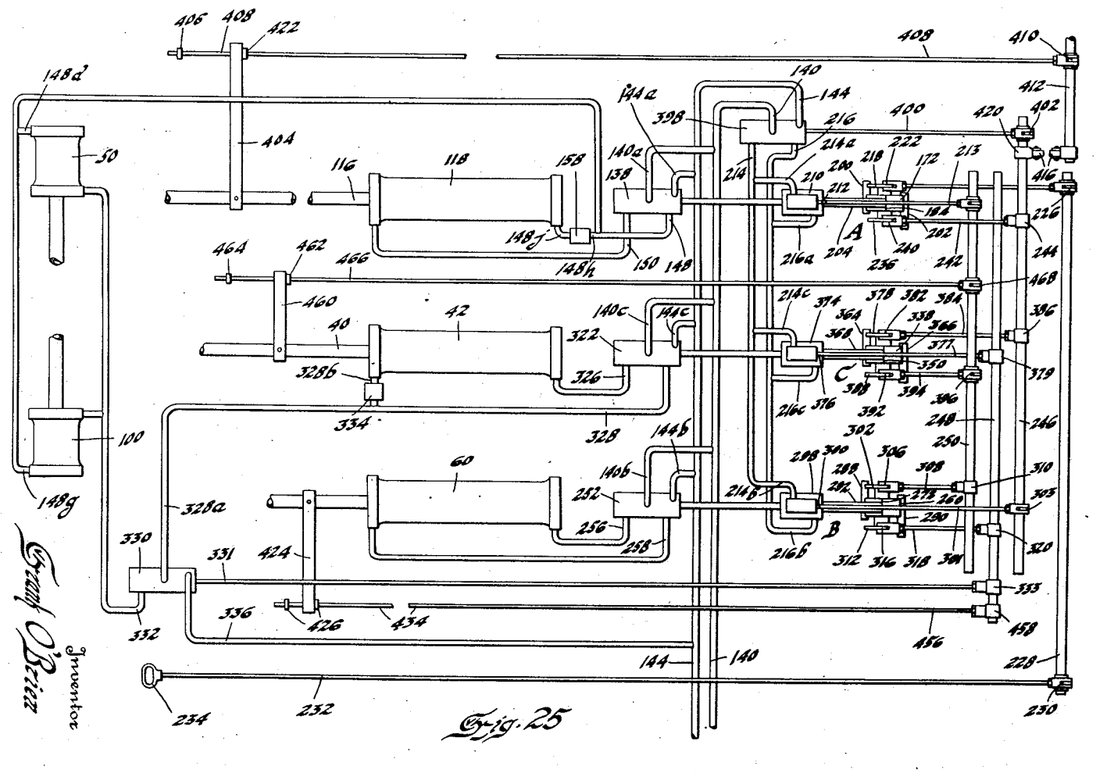
Figure 25 is a diagrammatic view showing the operating mechanism the controls therefor, and the piping between the controls and the various operating cylinders.

When the piston 324 is in the position shown in Fig. 12, it permits oil under pressure to flow out through a pipe 328 into the opposite end of the cylinder 42, in order to return the swinging head 32 to its starting position. As shown in Fig. 25, a branch pipe 328a leads from the pipe 328 into a valve 330, which is identical in construction with the valve 138 shown in Fig. 10, except that the opening corresponding to that marked 148 in Fig. 10 is plugged. A piston, exactly like the piston 146, is slidably mounted in this valve and is controlled by a link 331 connected to a lever 333 located on the underside of the shaft 248. The branch pipe 328a connects to the inlet opening of the valve 330, and when the piston in this valve is moved to the left as viewed in Fig. 25, the pressure medium flows through a pipe 332 into the cylinder 50 to move the carrier 44 away from the tubing and return it to its original or starting position, and also into the cylinder 100 to unclamp the vise 72. As stated in the description of the sequence of the bending operations, it is desired to open the vise and move the carrier away from the tubing before the second bend sheave is returned to starting position. Therefore, a loading valve 334, similar to the valve 158 shown in Fig. 16, is located in the pipe 328. This valve is adjusted so that it will not open until the pistons in the cylinders 50 and 100 have reached the end of their return stroke, after which the pressure medium flows through a pipe 328b into the cylinder 42 to return the swinging head 32 to its starting position.

Since the cylinders 50 and 100 are both mounted on the swinging head 32 and the valve 330 is mounted adjacent the control units on a stationary part of the machine, the pipe connections between these cylinders and the valve must be so constructed as to permit relative movement between them. Accordingly the pipe 332 is connected with the stationary manifold 152 and the pressure medium flows through a groove 332a in the manifold and the member 156, thence through a pipe 332b into the cylinder 50 to move the carrier 44 away from the tubing. A branch pipe conducts the pressure medium from the pipe 332b through a sliding type pipe joint, similar to that indicated by the numeral 148f, into a pipe 332d and thence into the cylinder 100 to move the vise 72 to unclamped position. When the piston in the valve 330 is moved to the right as viewed in Fig. 25, the pressure medium in the cylinders 50 and 100 may be forced by the movement of the pistons therein through the pipe 332 and thence through the valve 330 and out the exhaust pipe 336 which connects with the oil return pipe 144. It will be understood that when the piston in the valve 330 is moved to the left as viewed in Fig. 25, the exhaust opening connected with the pipe 336 is closed off, and when moved to the right the inlet opening connected with the pipe 328a is closed off. In other words the pipe 332 is always in communication either with the inlet pipe 328a or the exhaust pipe 336.

The movement of the piston 324 in the valve unit C is controlled by a ratchet member 338 rotatably supported on a shaft 340 held in the support 136. An arm 342 formed on this ratchet member is connected to the piston by a rod 344. Notches 346, 348 and 350 are formed in the ratchet member 338, similar to those shown in Fig. 19. Two plates 352, having cam surfaces 353 similar to those shown in Fig. 20, are mounted on the hub of the ratchet member 338, one on each side of the latter. Arms 354 on each plate are connected to a block 356, which in turn is connected by an adjusting screw 358 to a cross shaft 360 held in the support 136.

A tension spring 362 secured at one end to the support 136 and at the other end to the rod 344, tends to move the piston 324 to the right, but is prevented from doing so when the piston is in the central position by a pawl 364, which engages the notch 346 in the ratchet member 338. This pawl is mounted on the support 136 and is normally spring held against the ratchet member 338. A similar pawl 366 engages the notch 348 to hold the piston 324 in the extreme left hand position after it has been moved to that position. The piston is moved to the left by means of a pawl 368 which engages the notch 350 in the ratchet member. This pawl is pivotally supported in a sliding block 370 and is normally spring held against the ratchet member 338. This sliding block is connected to a piston 372 in a cylinder 374 and a spring closed valve 376 may be opened to admit oil pressure into the cylinder 374 from a pipe 214c. A rod 377, slidably mounted in the support 136 and adapted to abut against the end of the valve 376, is connected to a lever 379 secured on the underside of the shaft 248. A pipe 216c conducts oil under pressure into the opposite end of the cylinder when it is desired to return the piston to its original position.

A cam 378 having an angular surface 380, similar in shape to that indicated by the numeral 218 in Fig. 21, is rotatably supported on the shaft 340, on the far side of the ratchet member 338, as viewed in Fig. 12. An arm 382 on the cam 378 is connected by a link 384 to a lever 386 secured on the underside of the shaft 246. Rotatably supported on the shaft 340 on the near side of the ratchet member 338, as viewed in Fig. 12, is another cam 388 having an angular surface 390, similar to that shown in Fig. 22. An arm 392 on this cam is connected by a link 394 to a lever 396 on the upper side of the shaft 250. The operation of the various parts in this unit is the same as in the valve units A and B.

Mounted upon the support 136 above the valve units is a valve 398, exactly like the valve 138 and containing a piston similar to the piston 146. The movement of this piston is controlled by a link 400, connected to a lever 402 on the shaft 246, as shown in Fig. 25. The oil pressure pipe 140 and the return pipe 144 connect with this valve and when the piston therein is moved to the right as viewed in Fig. 25, the pressure medium flows out through a pipe 214 and thence through the pipes 214a, 214b and 214c to the valves 212, 300 and 376 respectively. When the piston in the valve 398 is moved to the left as viewed in Fig. 25, oil under pressure flows through a pipe 216 and thence through the pipes 216a, 216b and 216c to the cylinders 210, 298 and 374, respectively. It will be understood, of course, that when the pressure medium is flowing through the pipe 214, the oil in the pipe 216 is forced out through the exhaust opening in the valve 398 into the return pipe 144, or, when the pressure medium is flowing through the pipe 216, the oil in the cylinders 210, 298 and 374 unseats the valves 212, 300 and 376 respectively and flows out into the pipe 214 and thence through the exhaust opening in the valve 398 into the return pipe 144.

The movement of the shafts 246, 248 and 250 is controlled by means of connecting linkage associated with the various moving parts of the machine. Referring to Fig. 3, an arm 404 on the underside of the support 112 engages a lug 406 on a link 408 when the drawbar has been inserted the proper distance into the tubing. The link 408 is connected to a lever 410 secured to a rock shaft 412 supported on the base 30. As shown in Fig. 1, another lever 414 on the shaft 412 is connected by a link 416 to a lever 420 keyed to the shaft 246. It will be obvious that as soon as the arm 404 engages the lug 406, the link 408 and associated mechanism will cause the shaft 246 to be rocked, thus operating the control mechanism to shut off the flow of the pressure medium to the cylinder 118. Another lug 422 secured to the support 112 engages the opposite side of the arm 404 to move the link 408 in the opposite direction to cut off the oil pressure to the opposite end of the cylinder 118. The location of the lugs 406 and 422 may be varied with respect to the arm 404 to provide for different lengths of movement of the drawbar 122.

Referring to Figs. 1 and 2, movement of the rack 56 in a direction which will form the first bend in the tubing will cause a rod 424, secured to the rack, and having a yoke 426 fixed thereon, to move a lever 428 in that direction. The lever 428 is keyed to a shaft 429 supported on the outside of the cylinder 60 and a bevel gear 430 is also keyed to the shaft. This gear meshes with another bevel gear 432 slidably keyed to a shaft 434 to permit relative axial movement between the gear and the shaft when the carrier 44 is moved toward and away from the tubing by the cylinder 50. The shaft 434 has secured to its opposite end a bevel gear 436 which meshes with another bevel gear 438 keyed on a cross shaft 440. A spur gear 442 secured on this shaft meshes with rack teeth 444 cut on a vertically extending shaft 446, which is located exactly on the swivelling center of the swinging head 32, to permit the latter to turn without causing any change to take place in the axial position of the shaft 446 or associated control mechanism.

It will be understood that the shafts 446, 440 and 434 are supported upon the swinging head 32 and consequently must turn with the latter. For this reason circular teeth 448 are cut on the bottom end of the shaft 446 and a spur gear 450 keyed to a shaft 452 meshes with these teeth. The shaft 452 is supported from the stationary manifold 152 and has secured on it a lever 454 connected by a link 456 to another lever 458 carried by the shaft 248 of the control mechanism. It will be readily seen that as the rack 56 reaches the limit of its predetermined movement in one direction it will through the above described linkage cause the control mechanism to shut off the flow of the pressure medium to the cylinder 60. When the rack reaches the end of its movement in the opposite direction it will cause the linkage to operate the control mechanism so that it will shut off the flow of oil under pressure to the opposite end of the cylinder 60. The comparatively large number of parts present in the linkage between the rack 56 and the control mechanism is necessitated by the fact that the rack is mounted on a part which must swing with respect to the controls.

An arm 460, carried by the rack 40, engages either a lug 462 or 464, adjustably secured to a link 466, when the rack has moved the desired distance in either direction. The link 466 is connected to a lever 468 keyed on the shaft 250, and when the link is moved in either direction it rocks the shaft 250 and causes the control mechanism to cut off the flow of the pressure medium to either side of the cylinder 42.

*Operation of control mechanism*

After the operator has placed the tubing T in between the sheaves 62 and 108 he pulls the handle 234. This through the intermediate connecting linkage rocks the cam 218 in a counter-clockwise direction of rotation and the angular surface 220 thereon forces the pawl 200 out of the notch 180 in the ratchet member 172. The latter together with the piston 146 is now pulled to the right, as viewed in Fig. 10, by the action of the spring 198, permitting oil under pressure to flow through the pipe 148 and associated connections into the cylinders 50 and 100. The resulting movement of the piston in the cylinder 50 causes the carrier 44 to be moved toward the tubing so that the sheave 62 will lie against the outside surface of the tubing, while the resulting movement of the piston in the cylinder 100 will cause the vise 72 to clamp the tubing tightly against the sheave 62. After both of these movements have taken place, the spring held valve 158 opens and the pressure medium flows into the cylinder 118 through the pipe 148j. This causes the drawbar 122 to be inserted inside the tubing. After the drawbar has been inserted the proper distance, the arm 404 on the support 112 strikes the lug 406 on the control link 408 and through the associated linkage rotates the shaft 246 in a counter-clockwise direction.

Through the link 400 the piston in the valve 398 is moved to the left as viewed in Fig. 25, thereby forcing oil under pressure into the pipe 214. The link 242 rocks the cam 236 in a clockwise direction, while the link 384 rocks the cam 378 in the same direction. This movement of the cams 236 and 378 is a return movement to get these cams in proper position for operating movements to be described hereafter. It will be noted that the flow of the pressure medium to the cylinders 50, 100 and 118 is not shut off, but is left on to positively hold the various parts which these cylinders operate in proper position during the bending operations. This movement of the shaft 246 also causes the rod 301 to strike the end of the valve 300 and hold it off its seat, thus permitting the pressure medium to enter the cylinder 298 and move the piston 296 causing the pawl 292 to rock the ratchet member 260 in a clockwise direction. The piston 254 is thereby moved from the extreme right to the extreme left position, as viewed in Fig. 11, permitting the oil under pressure to flow through the pipe 256 into the cylinder 60. The piston 254 is held in this position by the engagement of the pawl 290 with the notch 270 in the ratchet member 260.

The resulting movement of the piston 58 rotates the sheave 62 and forms the first bend in the tubing in the manner previously described. When the sheave 62 has turned a predetermined amount, the control member 424 and associated linkage rock the shaft 248 in a clockwise direction. The link 318 thereupon rocks the cam 312 in a counter-clockwise direction and the cam surface 314 lifts the pawl 290 out of the notch 270 in the ratchet member 260 and permits the spring 286 to pull the piston 254 to the right to neutral position, where it is held by the engagement of the pawl 288 with the notch 268, as shown in Fig. 11. At the same time the link 331 moves the piston in the valve 330 to the left as viewed in Fig. 25, to permit a flow of oil under pressure for a return movement to be presently described. This movement of the shaft 248 also causes the rod 377 to engage the end of the valve 376, thus lifting it off its seat and permitting the oil under pressure to flow from the pipe 214c into the cylinder 374. The piston 372 is thereby moved to the right as viewed in Fig. 12 and the pawl 368 rocks the ratchet member 338 in a clockwise direction. This, of course, moves the piston 324 from the extreme right to the extreme left, where it is held by the pawl 366 engaging the notch 348 in the ratchet member.

While the piston 324 is in this left position, oil under pressure flows through the pipe 326 into the cylinder 42 and the resulting movement of the piston therein causes the swinging head 32 to turn and form the second bend in the tubing in the manner previously described. After the head 32 has turned the desired amount, the arm 460 engages the lug 464 on the link 466, and through the intervening linkage causes the shaft 250 to be rocked in a counter-clockwise direction. The link 394 thereupon rocks the cam 388 in a counter-clockwise direction and the angular surface 390 lifts the pawl 366 out of engagement with the notch 348, thus permitting the spring 362 to pull the piston 324 to the right to neutral position where it is held by the engagement of the pawl 364 with the notch 346 in the ratchet member 338, as shown in Fig. 12.

This concludes the bending operations and the balance of the movements of the control mechanism serve to return the various parts of the machine to their starting position. The last described movement of the shaft 250 causes the link 308 to rock the cam 302 in a clockwise direction. This is not an operating movement but is merely a return movement to get the cam in proper position for an operating movement to be described later. This movement of the shaft 250 also causes the rod 213 to engage the end of the valve 212 and hold it off its seat, thereby permitting the pressure medium to flow into the cylinder 210. The resulting movement of the piston 208 causes the pawl 204 to rock the ratchet member 172 in a clockwise direction, thus moving the piston 146 to the extreme left, where it is held by the engagement of the pawl 202 with the notch 182 in the ratchet member 172, as shown in Fig. 14.

While the piston 146 is in this position, oil under pressure flows through the pipe 150 into the cylinder 118. The resulting movement of the piston therein withdraws the drawbar from the inside of the tubing, and, at the end of the withdrawal movement, the arm 404 engages the lug 422 on the link 408. Through the associated linkage this rocks the shaft 246 in a clockwise direction. The link 242 thereupon rocks the cam 236 in a counter-clockwise direction and the cam surface 238 thereon lifts the pawl 202 out of engagement with the notch 182, permitting the spring 198 to pull the piston 146 to the right to neutral position, where it is held by the engagement of the pawl 200 with the notch 180 in the ratchet member 172, as shown in Fig. 10. Through the link 400 the piston in the valve 398 is moved to the left as viewed in Fig. 25, permitting the pressure medium to flow through the pipe 216 to the valves 212, 300 and 376, and to return from the pipe 214 to the return line 144. Also the rod 301 is returned to its starting position by the last described movement of the shaft 246.

At the same time the link 384 rocks the cam 378 in a counter-clockwise direction causing the angular surface 380 to lift the pawl 364 out of engagement with the notch 346 in the ratchet member 338. This permits the spring 362 to pull the piston 324 to the extreme right, whereupon the pressure medium flows through the pipe 328, valve 330 and pipe 332 into the cylinders 50 and 100. The carrier 44 is thereby moved away from the tubing to permit the easy withdrawal of the latter, and at the same time the vise 72 is unclamped and drops to the position shown in Fig. 3. After both of these movements have been concluded, the pressure in the pipe 328 increases to a point high enough to open the spring held valve 334, thus permitting the oil under pressure to flow through the pipe 328b into the cylinder 42. The resulting movement of the piston therein rotates the swinging head 32 back to its starting position. At the end of this movement the arm 460 engages the lug 462 on the control link 466 and through the associated linkage rocks the shaft 250 in a clockwise direction.

As a result of this movement of the shaft 250 the rod 213 is returned to starting position, while the link 394 rocks the cam 388 in a clockwise direction to return it to starting position. At the same time the link 308 rocks the cam 302 in a counter-clockwise direction, thereby causing the angular surface 304 to lift the pawl 288 out of engagement with the notch 268 in the ratchet member 260. The spring 286 thereupon pulls the piston 254 to the extreme right, as viewed in Fig. 11, and the pressure medium flows through the pipe 258 into the cylinder 60. The piston in the latter causes the first bend sheave to be rotated back to its starting position, and as it reaches that point, the control member 424 and associated linkage rock the shaft 248 in a counter-clockwise direction.

As a result of this movement the link 331 pulls the piston in the valve 330 to the extreme right, as viewed in Fig. 25, to disconnect the pipe 332 from the pipe 328a and to connect the pipe 332 with the pipe 336 so that when the pistons in the cylinders 50 and 100 are moved on their next working movement the oil in the pipe 332 may be forced back into the return line 142. At the same time the link 318 rocks the cam 312 in a clockwise direction to return it to its starting position, while the rod 377 is moved to the right to its starting position. All of the various parts of the machine including the control mechanism are now back in their starting positions and the operator removes the bent tubing and inserts another piece in the machine and by pulling the handle 234 starts the machine in operation again.

Due to the use of the automatic control mechanism, the bending operations and returning movements of the various parts are performed in a very brief amount of time. This, of course, increases the output of the machine and lowers the cost of the finished product. Another advantage of the automatic control is that each step is positively performed in proper order, and, as the skill or judgment of the operator is not relied upon to any extent, there is no possibility of turning out tubing in which the bends are formed incorrectly due to carelessness or ignorance on the part of the operator. For this reason unskilled labor may be used to feed and start the machine, and this also is a factor in reducing the cost per piece of the tubing bent.

It will thus be seen that my improved machine not only forms more uniform and satisfactory bends in tubing than do the machines used in the past, but also dispenses with the use of skilled labor and materially reduces the cost of the finished article. It will be understood, of course, that by changing the shape or size of the first or second bend sheaves, or by adjusting the lugs on the control linkage, different shapes and lengths of bends may be formed, or different sizes of tubing may be bent.

While I have described a specific embodiment of my invention, it will be obvious that various changes in size, shape, and proportions and details of assembly may be made without departing from the spirit and scope of the appended claims.

I claim:

1. Tube bending apparatus comprising, in combination, a support adapted to be inserted inside the tubing, a device adapted to grip the tubing, means to rotate said device so that the tubing is drawn over said support in one direction to form a bend in the tubing, and means to swing said device so that the tubing is drawn in another direction over said support to form a second bend in the tubing.

2. Tube bending apparatus comprising, in combination, a rotatable member, gripping means adapted to clamp the tubing against said member, a support adapted to be inserted inside the tubing, means to rotate said member and said gripping means whereby the tubing is drawn over said support to form a bend in the tubing, a second rotatable member, and means to rotate said second member whereby the first member and the gripping means is swung around thereby drawing the tubing in the opposite direction over said support to form a second bend in the tubing.

3. Tube bending apparatus comprising, in combination, a swinging head, a carrier slidably mounted on said head, a rotatable member supported in said carrier, a support adapted to be inserted inside the tubing, a tube gripping device, separate pressure actuated means for operating each of the aforesaid elements, and automatic control mechanism adapted to supply pressure to each of said means in the proper sequence first to cause said elements to operate to form a plurality of bends in the tubing and then to cause said elements to return to starting position.

4. Tube bending apparatus comprising, in combination, a tube gripping device, pressure actuated means to operate said device, and connecting means interposed between said pressure actuated means and said devise, said connecting means serving to limit the maximum gripping pressure exerted by said device regardless of the amount of pressure supplied to said pressure actuated means.

5. Tube bending apparatus comprising, in combination, a rotatable member, a vise adapted to clamp the tubing against said member, pressure actuated means for operating said vise including toggle mechanism which limits the maximum clamping pressure regardless of the amount of pressure applied to the operating means, and means adapted to rotate said member to form a bend in the tubing.

6. In combination, a valve, means to move said valve in one direction, a member connected to said valve, holding means adapted to engage said member to hold the valve in one position, releasing means adapted to disengage the holding means from said member to permit the valve to be moved to a second position, a second holding means adapted to engage said member to hold said valve in a second position, a second releasing means adapted to disengage said second holding means from said member to permit said valve to be moved to a third position, and means to move the valve from the third to the first position.

7. In combination, a valve adapted to be moved to three positions, a shaft, a ratchet member journalled on said shaft and connected to said valve, a spring connected to said valve to move the latter in one direction, a plurality of notches in said ratchet member, a pawl adapted to engage one of said notches to hold the valve in one position, a cam journalled on said shaft and adapted to be moved to lift said pawl out of engagement with said notch to permit the valve to move to a second position, a second pawl adapted to engage a second notch in said ratchet member to hold the valve in the second position, a second cam journalled on said shaft and adapted to be moved to lift said second pawl out of engagement with said second notch to permit the valve to be moved to a third position, and means adapted to engage a third notch in said ratchet member to move the valve from the third to the first position.

8. Tube bending apparatus comprising, in combination, a base, a swinging head journalled in the base, means to swing said head, a carrier slidably supported on said head, means to move said carrier, a rotatable member journalled on said carrier, means to rotate said member, a vise adapted to grip the tubing, means to operate said vise, a support adapted to be inserted inside the tubing, and means to insert and withdraw said support.

9. Tube bending apparatus comprising, in combination, a support, a cylinder adapted to insert or withdraw the support from the inside of the tubing, a vise adapted to grip the tubing, a second cylinder serving to operate said vise, a carrier adapted to be moved toward or away from said tubing, a third cylinder adapted to move said carrier, a valve adapted to admit a pressure medium into either end of the first cylinder and into the operating end of the second and third cylinders, a spring held valve between the first valve and the first cylinder, a rotatable member supported on said carrier, a fourth cylinder adapted to rotate said member, a second valve adapted to admit the pressure medium into either end of the fourth cylinder, a swinging head upon which said carrier is slidably supported, a fifth cylinder adapted to swing said head, a third valve adapted to admit the pressure medium into either end of the fifth cylinder and into the return end of the second and third cylinders, a second spring held valve between the third valve and the fifth cylinder, operator controlled means to move the first valve to a position whereby pressure will be admitted to the second and third cylinders to close the vise and move the carrier toward the tubing, after which the pressure medium flows through the spring held valve into the first cylinder to insert the support in the tubing, means operable at the end of such movement to place the second valve in position to admit the pressure medium into the fourth cylinder, thereby rotating said member together with said vise and a portion of the tubing to form a bend in the latter, means operable at the end of such movement to move the second valve to neutral position and to move the third valve into position to admit the pressure medium into the fifth cylinder, thereby swinging said head together with the rotatable member, the vise and a portion of the tubing to form a second bend in the latter, means operable at the end of such movement to move the third valve into neutral position and to move the first valve into position to withdraw the support from the inside of the tubing, means operable at the end of such movement to move the first valve into neutral position and to move the third valve into position to admit the pressure medium into the second cylinder to release the vise and into the third cylinder to move the carrier away from the tubing, then through the second spring held valve into the fifth cylinder to return the swinging head to starting position, and means operable at the end of the latter movement to move the second valve into position to admit the pressure medium into the fourth cylinder to return the rotating member to starting position.

10. The method of bending tubing which consists in inserting a support inside the tubing, clamping the tubing against a member, rotating the member to draw the tubing over the support to form a bend therein, and then rotating a second member, in a direction which will draw the tubing over the support to form a second bend therein.

11. The method of bending tubing which consists in gripping the tubing in a vise, inserting a support inside the tubing, rotating the vise to draw the tubing over the support to form a bend in the tubing and then swinging the vise to draw the tubing over the support in a different direction to form a second bend in the tubing.

12. Tube bending apparatus comprising, in combination, two rotatable supports for the outside of the tubing, means adapted to grip the tubing against one of the supports, means adapted to rotate the latter support to form a bend in the tubing, and means adapted to rotate the other support to form a second bend in the tubing.

13. Tube bending apparatus comprising, in combination, a support for the outside of the tubing, means adapted to draw the tubing around said support to form a bend in the tubing, and means adapted to swing the support and the first named means to form a second bend in the tubing.

14. Tube bending apparatus comprising, in combination, a support for the outside of the tubing, means adapted to draw the tubing around said support to form a bend in the tubing, a second support for the outside of the tubing, and means adapted to swing the first-named support and the first named means whereby the tubing is drawn around the second support to form a second bend in the tubing.

15. Tube bending apparatus comprising, in combination, a rotatable member, means to clamp the tubing against said member, means to rotate said member and said clamping means to form a bend in the tubing, and means to swing said member and said clamping means to form a second bend in the tubing.

16. Tube bending apparatus comprising, in combination, means adapted to support the inside of the tubing, two separate means adapted to support the outside of the tubing on opposite sides, means adapted to draw the tubing around one of the outside supporting means and over the inside supporting means in one direction to form a bend in the tubing, and means adapted to draw the tubing around the other outside supporting means and over the inside supporting means in another direction to form a second bend in the tubing.

In testimony whereof I affix my signature.

FRANK O'BRIEN.